June 29, 1937.　　　　S. L. C. COLEMAN　　　　2,085,006
VEHICLE SUSPENSION
Filed Sept. 27, 1933　　　　5 Sheets-Sheet 5
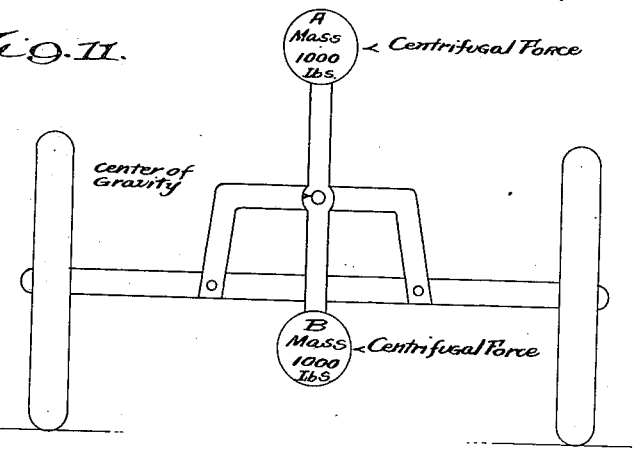
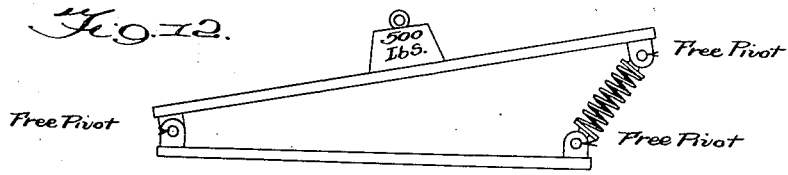
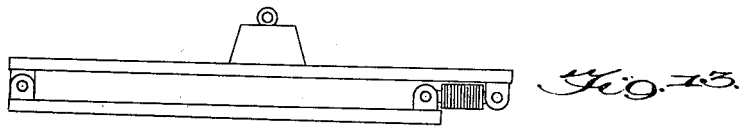
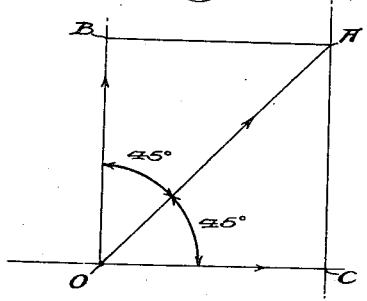
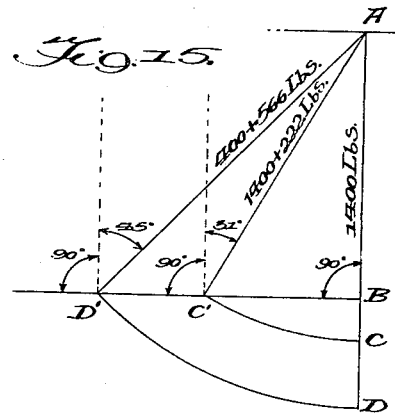
INVENTOR.
Stephen L. C. Coleman,
BY
ATTORNEYS.

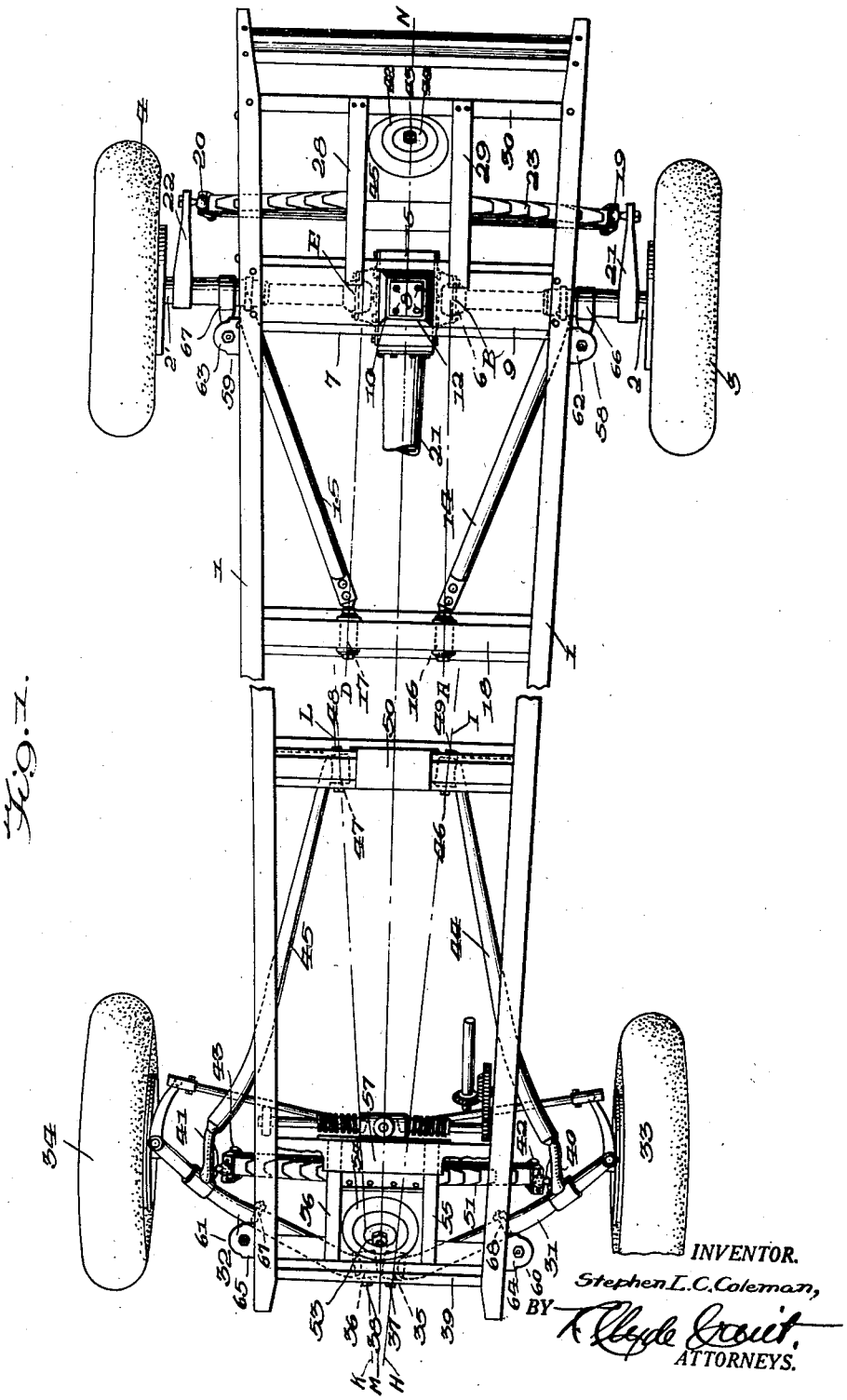

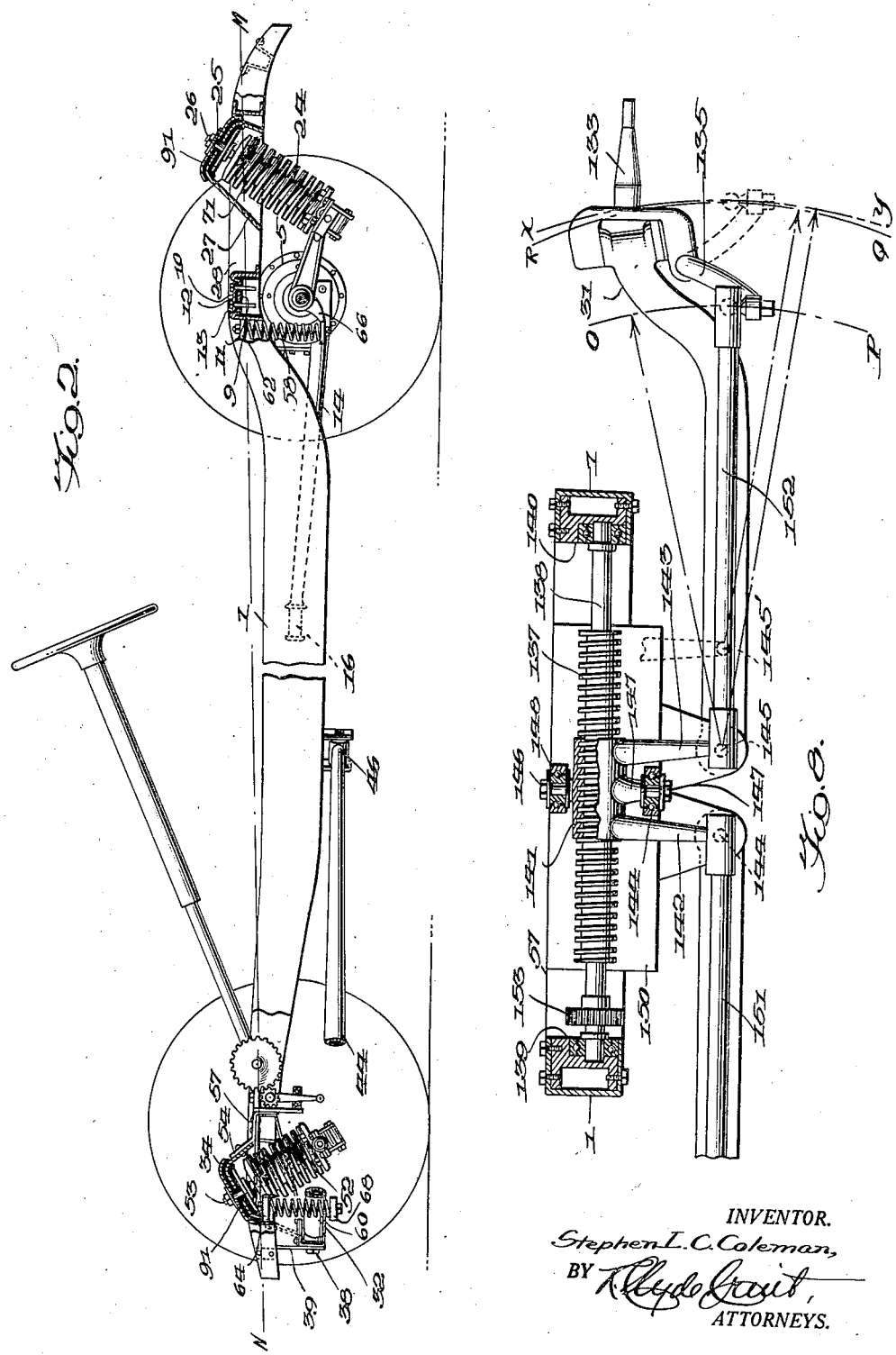

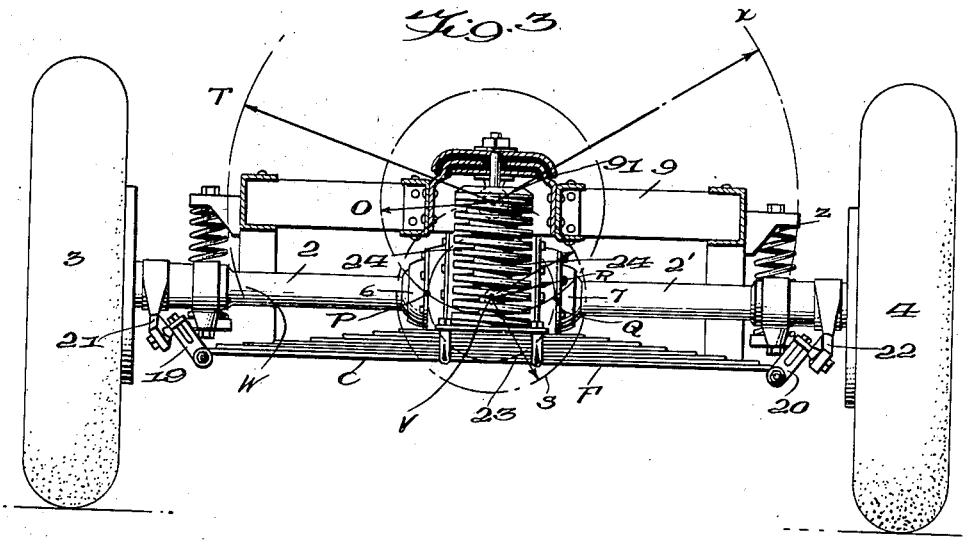

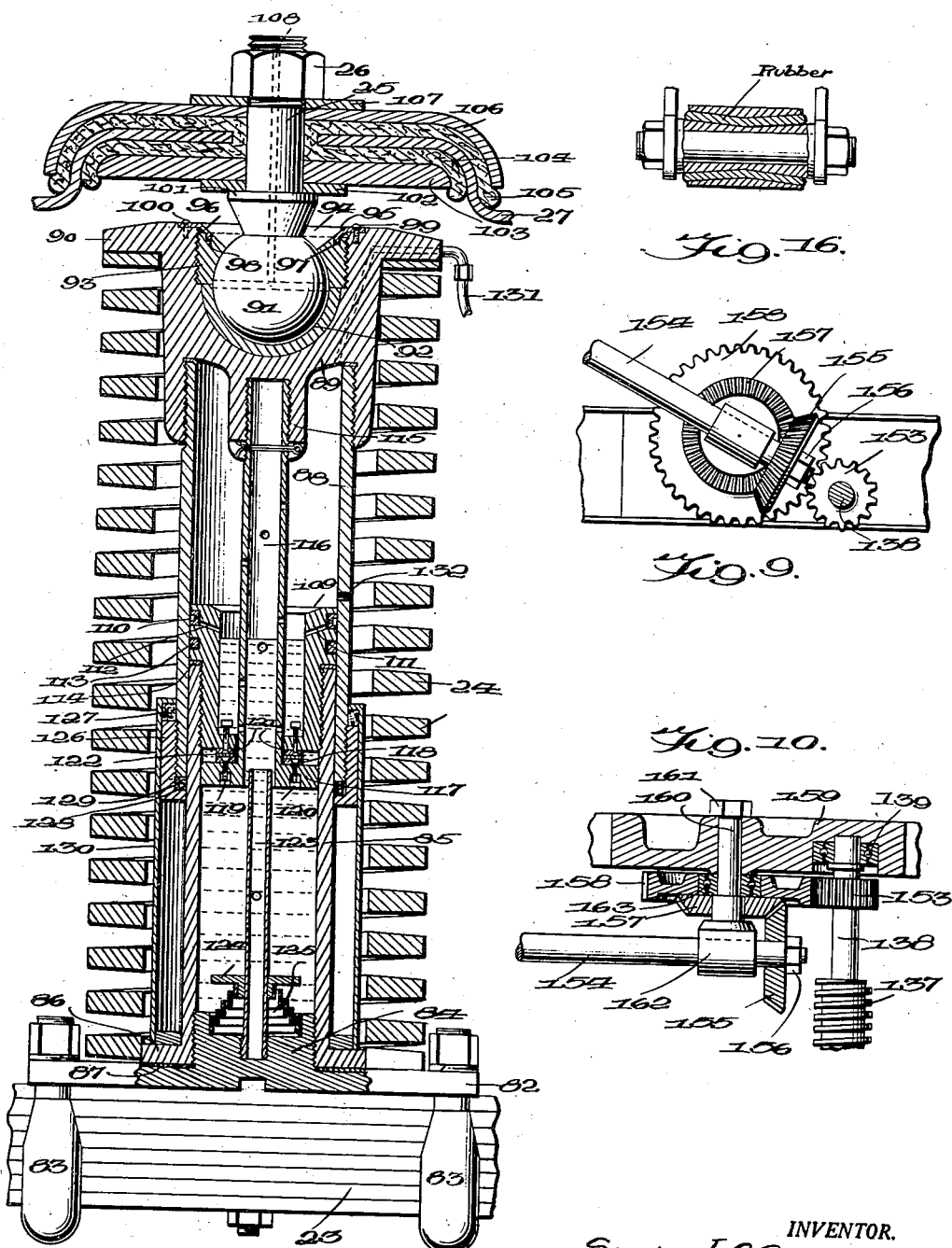

Patented June 29, 1937

2,085,006

UNITED STATES PATENT OFFICE 2,085,006

VEHICLE SUSPENSION

Stephen Leonard Chauncey Coleman, Fredericton, New Brunswick, Canada

Application September 27, 1933, Serial No. 691,231

19 Claims. (Cl. 280—124)

This invention relates to spring suspensions of the same general or broad principles as set forth in applicant's Reissue Patent No. 18,177 dated September 8, 1931, but in the instant invention many improvements are set forth and the design is better calculated to secure the utmost advantage from the principles involved.

The broad object of the invention is to combine a spring suspension of the type herein described, with independently sprung wheels.

A further object is to greatly increase the flexibility under one wheel action at both the front and rear ends of the car, while at the same time the stability against rolling is very greatly increased.

Another object is to insure equal resistance against rolling at both the front and rear axles and to eliminate the heavy twisting stresses usually set up in the frame and body of a car, when passing over uneven road surfaces.

A further object is to equalize the load on the wheels on each side of a car at all times, and to greatly reduce overbounding, afterbounding and pitching.

Another object is to eliminate high frequency vibration by the use of rubber insulation at all points of contact between the running gear and frame and to relieve the main suspension springs from all torsional stresses.

Another object is to provide a spring suspension with dual characteristics giving extreme flexibility on the first part of the spring suspension stroke, with sufficient resistance on the last part of the stroke to prevent frequent bottoming.

A still further object is to provide a spring suspension with springs in series, having widely different degrees of flexibility, so that it is impossible to have them both at the same time synchronize with the road undulations and thereby to provide a more comfortable and safer car to drive.

Generally stated the improved spring suspension comprises front and rear semi-elliptic transverse laminated leaf springs each provided at its center with a coil spring, preferably enclosing a pair of telescoping tubes, the lower tube being secured to the leaf spring, while the top tube is surmounted by a ball and socket joint through which it is attached to the vehicle frame. The coil spring in this combination tends to hold the tubes extended in relation to each other, and supports the weight of the vehicle in series with the leaf spring. The coil and leaf spring are preferably arranged at an angle to the vertical plane, in such a way that the angle increases under spring stroke.

The front and rear spring suspensions are identical in all respects except as to dimensions and degrees of flexibility. In combination with these main springs are four double acting coiled springs, two on each side of the frame and each mounted between a pair of brackets forming suitable seats, one bracket of each pair being fixed to the frame and the other fixed to the axle. The coil springs are attached to the brackets by means of bolts and nuts passing through eyes formed in the end coils of each spring and through holes in the center of each bracket seat.

Each of the ends of the transverse leaf springs is connected to the running gear by means of a shackle having a pivot pin joint at its lower end, and a ball and socket joint at its upper end, as clearly shown in Figures 1, 2, 3, 4 and 5. The running gear used in this instance in combination with the novel spring suspension herein described, is of a type commonly known as the swinging axle type, and provides for independently sprung wheels.

The preferred embodiment of the invention is illustrated in the accompanying drawings, in which Figure 1 is a plan view of the complete assembly;

Figure 2 is a view partly in elevation and partly in section of the complete assembly;

Figure 3 is a rear elevational view showing the arrangement of the rear end of the suspension;

Figures 4 and 5 are enlarged detail views of the ball and socket shackle construction used on the outer ends of the transverse leaf springs;

Figure 6 is an enlarged detail view of the combined coil spring and hydraulic shock absorber construction;

Figure 7 is a fragmentary plan view illustrating the novel form of steering gear employed, the front spring mechanism being omitted;

Figure 8 is a transverse elevational view partly in section of said steering gear, the front spring mechanism being omitted;

Figures 9 and 10 are detail views of certain portions of the steering gear;

Figures 11, 12, 13, 14 and 15 are diagrammatic views illustrating the practical and theoretical operation of the present spring suspension construction; and Figure 16 is a detail view of the preferred form of rubber bushed shackle employed.

Referring to the drawings in detail the present invention comprises a chassis frame consisting of side rails 1—1 and a special arrangement of cross members to be more specifically referred to later. Mounted at one end of the frame are rear axle tubes 2—2' carrying the road wheels 3 and 4 on their outer ends and said axle tubes are attached to a differential case 5 by hollow ball joints 6 and 7, said joints being similar in design to those commonly used on the front ends of the torque tube housing the drive shaft in some cars. Inside the ball joints 6 and 7 are universal joints (not shown) connecting the differential with live axles inside the axle tubes 2, 2', these live axles revolving the road wheels in the usual manner. The differential case 5 instead of being carried by the axle is attached by four bolts 8 to a cross member 9 of the frame, said case being provided with a squared top for the purpose. At the point where the differential 5 is attached to the cross member 9 there is a square shaped depression 10 formed in the cross member corresponding to the squared top of the case, for the purpose to be hereinafter described. Between the squared top of the differential case 5 and the cross member 9 of the frame there is provided a rubber, or similar pad, 11 and a like pad 12 is arranged in the depression 10, this pad 12 being covered by plate 13 and said plate 13 and the differential case 5 are firmly held together by four screw studs 8. The holes in the cross member 9, through which the studs 8 pass are much greater in diameter than the studs, and therefore there is no metal to metal contact between the differential case 5 and the cross member 9.

The axle tubes 2 and 2' are held at right angles to the center line of the chassis frame by torque arms 14 and 15. These arms are made of steel tubing and the rear ends of said tubes are firmly bolted to lugs, fast to the axle housing, so that the axle tubes cannot revolve in relation to the torque arms. The front ends of the torque arms 14 and 15 terminate in cylindrical pins which are inserted in rubber bushed bearings 16 and 17 respectively, mounted in a cross member 18 of the frame. The axis of the pin joint 16 is in line with the center of ball joint 6 and the axis of the two joints 16 and 6 is along the line A—B which is parallel with the longitudinal center axis of the chassis. The line A—B is the hinge axis of the wheel 3 and in a like manner the line D—E is the hinge axis of the wheel 4.

The torque arms 14 and 15 take the drive of the car, the drive torque and brake torque and retain the axle tubes 2, 2' at right angles to the longitudinal center axis of the chassis frame. Mounted adjacent the rear axle tubes 2—2' is a transverse laminated leaf spring 23 having an eye on each end by which it is flexibly connected through shackles 19 and 20 to arms 21 and 22 respectively, said arms being rigidly secured to, and projecting rearwardly from, the axle tubes 2, 2'. These shackles 19 and 20 will be described in more detail later.

Mounted on top of leaf spring 23, intermediate the ends thereof, (Figure 2) is a coil spring member of special form, the detailed construction of which will be hereinafter more fully described. Briefly this coil spring member comprises a coil spring 24 provided with a cap having a semi-spherical recess adapted to receive a ball headed stud 25. This stud 25 is provided with a nut 26 whereby the same is rigidly secured to an inverted cup-like member 27 supported between horizontal channel members 28 and 29. The forward ends of these channel members are secured to the cross member 9 and the rear ends of the channel members 28 and 29 are secured to a cross member 30. Referring back to the securing of the ball headed stud 25 to the cup-like member 27 it will be noted that there is no metal to metal contact between the stud 25 and the cup-like member 27 and the details of this connection will be described later in conjunction with the detailed construction of the coil spring member and its mounting.

The foregoing description has been in connection with the spring suspension at the rear end of the car. The construction of the spring suspension and its method of attachment to the frame and running gear is substantially the same at the front end of the car, the only difference being in the dimensions of the parts and the arrangement of the front axle tubes to provide for steering. These front axle tubes 31 and 32 carry the wheels 33 and 34 at their outer ends in the usual manner and the inner ends are provided with cylindrical bearings 35 and 36 (preferably fitted with rubber bushings) pivotally supported on pins 37 and 38 respectively, carried by the forward cross member 39 of the frame. Rigidly connected to axle tubes 31 and 32, near their outer ends, and projecting rearwardly therefrom are arms 40 and 41 provided with spring shackles 42 and 43 of the same type as used in connection with the rear spring suspension, details of which will be hereinafter more fully described. Rigidly fixed to the ends of arms 40 and 41 are torque tubes 44—45, the inner ends of which terminating in cylindrical bearings 46 and 47 (preferably rubber bushed) pivotally supported on pins 48 and 49 mounted in a cross member 50. The pivotal axis of bearings 35 and 46 are in line with each other in both planes so that the hinge axis of wheel 33 is along the line H—I. Likewise the pivotal axis of bearings 36 and 47 are also in line with each other, so that the hinge axis of wheel 34 is along the line K—L. Through this method of keeping the axis of the pivotal joints in line with each other in both planes, it is possible to use pin joints with rubber bushings, whereas otherwise it would necessitate the use of universal or ball joints.

Similar to the rear end suspension, the front axles 31 and 32 are provided with a transverse leaf spring 51 having its opposite ends pivotally secured to the shackles 42 and 43. Mounted upon the upper face and midway the ends of said spring 51, is a coil spring member 52 of the same construction as the coil spring member 24 used in conjunction with the rear wheel suspension, to be described in detail later. This front coil spring member is likewise provided with a ball headed stud 53 by which the upper end thereof is secured to an inverted cup-shaped member 54 supported between channel members 55 and 56 the rear ends of which being rigidly attached to a cross member 57 and the forward ends thereof, similarly attached to the forward cross member 39. Also in this front end construction the stud 53 is insulated from the cup-shaped member 54 in a manner similar to that shown in the rear end suspension to be hereinafter more fully described.

Co-operating with the main spring suspension are four open coiled double acting springs 58, 59, 60, 61, two on each side of the frame near each divided axle, said springs being provided respectively with brackets 62, 63, 64 and 65 designed to form seats for the coil springs fixed to the frame, and brackets 66, 67, 68 and 69 attached to the axles. Each coil spring is placed between a frame and axle bracket and is attached thereto by a bolt and nut, the bolts passing through a hole in the center of each bracket seat, and through an eye formed in the end coils of each spring.

These coils are designed to resist both compression and stretching and when the frame of the chassis is at its normal loaded height they are under no tension.

Their purpose is to take care of out of balance loading, to resist rolling about the central longitudinal axis of the vehicle, and to restrain the rise of the chassis frame above normal position.

As the great bulk of the weight of the car is supported on the ball-headed studs 25 and 53 at the top of the main spring suspension at each end of the car, the natural rolling axis would be along the dotted line M—N. For the sake of stability it is desirable to place the rolling axis M—N as near the height of the center of gravity as possible.

In Figure 2 it can be clearly seen that the spring assembly both front and rear, is mounted at a considerable angle to the vertical plane, and because the spring assembly is connected to the frame at its top by a ball joint, and at its bottom to the running gear by ball joints in the shackles at each end of the transverse leaf springs, when wheels 3 and 4 rise and compress the spring assembly, the angle of the spring assembly to the vertical plane is greatly increased. In this regard the front end spring suspension is mounted in the same way. The purpose of this angular mounting will be explained later herein.

Referring to Figures 4 and 5 there are shown two elevational views of the shackles 19, 20, 42 and 43 as used in connection with the spring assembly illustrated in Figures 2 and 3. These shackles comprise side links 74 and 75 having cylindrical projections at their upper ends adapted to receive cooperating plates 78 and 79, said plates so formed as to provide a spherical hollowed space between them at their intermediate portions to accommodate a ball 80 formed on a shank 81, the same being the medium by which said shackle is attached to the arms 21, 22, 40 and 41 in the assembly as shown in Figures 1 and 2. The plates 78 and 79 are held together by nuts 82 and 83 threaded on the upper cylindrical ends of the parts or links 74 and 75. The ends of the transverse springs 23 and 51 are placed between the side links 74 and 75 and pivotally connected therewith by a bolt or the like passing through the holes 84 and 85 near the bottom of said plates 74 and 75. The spherical parts of the plates 78 and 79 are cut away as at 86 and 87 to allow the shank 81, which is integral with the ball 80, to have ample clearance and permit a considerable free movement of the bottom end of the shackle, in any direction.

Mounted on top of leaf spring 23, intermediate the ends thereof, (Fig. 2) is coil spring member 24 of special form, the detailed construction of which to be hereinafter more fully described. The upper end of the coil spring member is provided with a semi-spherical recess adapted to receive a ball-headed stud 25. This stud 25 is provided with a nut 26 whereby the same is rigidly secured to an inverted cup-like member 27 supported between horizontal channel members 28 and 29. The forward ends of these channel members are secured to the cross member 9 and the rear ends of the channel members 28 and 29 are secured to a cross member 30. Referring back to the securing of the ball-headed stud 25 to the cup-like member 27 it will be noted that there is no metal to metal contact between the stud 25 and the cup-like member 27 and the details of the connection will be described in conjunction with the detailed construction of the coil spring member 24 and its mounting.

The improved type of coil spring member is illustrated in detail in Fig. 6, the same being a vertical sectional view of the cooperating parts. For the purpose of this description the coil spring member will be described in connection with the rear end suspension, the reference character 23 representing the rear transverse spring. Secured to this leaf spring is a circular plate 82 which is firmly secured to leaf spring 23 by U clamps 83. Plate 82 is provided with a cylindrical boss 84 to which is threaded a steel tube 85, having a flanged base 86 which screws down tight with tube 85 against a seal washer 87. Telescoping with a close sliding fit around the outside of tube 85 is tube 88 to which is secured by threads a top member or cap 89. This cap has a flange 90 which forms a seat for coil spring 24, and is further provided with a recess in its top center forming a seat for a ball 91, carried by the shank 25. An inserted bearing surface 92 for ball 91 is arranged within the recess and this insert together with the ball 91 is locked in position by a ring 93 shaped to fit the top part of ball 91 and threaded into the cap 89. A locking ring 94 is provided to prevent the ring 93 from moving, said locking ring 94 being constructed with projecting lugs 95 and 96 engaging recesses 97 and 98 in the ring 93, said locking ring 94 being secured to cap piece 89 by screws 99 and 100. Shank 25 of ball 91 is provided with a shoulder 101 above which is placed a round washer 102 which in turn carries a circular plate 103 and between this plate 103 and the inverted cup-like member 27 (see Fig. 2) is placed rubber or similar insulation 104 and above the member 27 is placed like insulation 105. This is surmounted by a steel saucer-like member 106 and above that a steel washer 107 all of said parts 102, 103, 104, 105, 106 and 107 being held in firm contact with the inverted cup-like member or frame hood 27 by a nut 26 threaded on said shank 25. It will be noted that there is no metal to metal contact between the shank 25 and the member 27. The ball-headed shank 25 is supplied with an oil duct 108 for lubricating the ball 91.

The purpose of the telescoping tubes is to furnish lateral stability for the coil spring and a self-centering effect to the chassis frame. In the present instance the interior of the tubes 85 and 88 contain in effect, a built in hydraulic shock absorber. Tube 85 has a cylindrical member 109 threaded thereon, and the outer upper portion of this cylindrical member 109 has a sliding contact with tube 88, said outer upper portion being formed with two annular grooves, the top groove carrying an oil wiping ring 110 similar to those used on the pistons of a gas engine and as it travels up and down wipes the surplus oil from the inside wall of tube 88 and returns it to the reservoir in the center of the cylindrical member 109 through ports 111 and 112. The lower annular groove carries an ordinary compression piston ring 113. A circular sealing gasket 114 is provided between the upper end of the tube 85 and the member 109. The bottom part of the member 109 is formed with a centrally disposed opening to be hereinafter referred to. The top piece 89 has a downwardly extending central boss 115 into which is threaded and locked, a tube 116 said tube extending downward through the opening in the bottom of the member 109 and having attached to its lower end a piston 117. This piston fits tube 85 closely and has a circular plate valve 118 which covers ports in the piston not shown. The valve is held in proper location and guided by pins 119 and 120, which slide up and down through holes in piston 117, the pins having enlarged ends so that they limit the lift of valve 118. A plate valve 121 identical in construction with the valve 118 is provided to control ports in the bottom of member 109. Between valves 118 and 121 is a flat circular spring 122 designed to ensure the closing of valves 118 and 121 when they are close together. In the center of tube 85 is tube 123 the lower end of which is threaded into boss 84, and the upper end of this tube projects into, and is concentric with, tube 116 and there is a small clearance between the walls of the tubes. Both tubes 116 and 123 are perforated with small holes at regular intervals throughout their lengths. Concentric with tube 123 near its bottom is a plate 124, this plate being supported by a volute spring 125 seated in a recess provided in boss 84. There is a re-inforcing circular end piece 126 for tube 88 and 127 is a circular felt gasket to exclude dust. A felt gasket 128 compressed by a contracting metal ring 129 is for the purpose of wiping off any oil which may have passed the piston rings above, and 130 is a metal dust shield which is attached to flange 86. In the top piece 89 is an oil duct fed by a flexible tube 131 for charging and replenishing the shock absorber with fluid and 132 is an overflow hole or port to prevent the overcharging with said fluid.

In a chassis which makes use of independently sprung wheels as herein described, the conventional types of steering gear and linkage usually employed with solid axles will not work satisfactorily, therefore a specially constructed and designed steering gear has been devised. In Figs. 7, 8, 9, and 10 is shown a novel type of steering gear and linkage developed for the independently sprung wheel suspension as set forth in the instant application.

Pivoted to the outer ends of the swinging axles 31 and 32 are the usual stub axles 133 and 134 to which are rigidly secured the steering arms 135 and 136 respectively for controlling the wheels 33 and 34. Mounted between the side rails 1 of the chassis is a worm gear 137 carried on shaft 138, the ends of this transverse shaft 138 being mounted in ball bearings 139 and 140. This worm gear 137 carries a large nut 141 having two integral arms 142 and 143 extending downward and each terminating in a ball 144 and 145. To retain arms 142 and 143 in their relative vertical plane, nut 141 has two stub shafts 146 and 147 on which are mounted ball bearing rollers 148 and 149. These rollers ride tightly against plate 150 secured to the cross member 57 and prevent any rotation of nut 141. Drag links 151 and 152 have suitable sockets near each inner end to receive the balls 144 and 145 on the ends of arms 142 and 143 and the opposite ends of these drag links are provided with sockets to engage the balls mounted on steering arms 135 and 136 thus forming a tie between these parts. The transverse shaft 138 has keyed to it at one end a spur gear 153 by means of which the worm gear 137 is revolved. In order to speed up the revolutions of the worm gear 137, a train of gears actuated by the conventional steering wheel is employed. These are more clearly shown in Figs. 9 and 10. In Fig. 9 only partial gears are shown, but this is merely for convenience of illustration, but of course in reality they are complete gears. The steering shaft 154 has mounted on its upper end the usual steering wheel, not shown. Keyed to the lower end of the shaft 154 is a bevel gear 155 secured by nut 156. Meshing with the bevel gear 155 is a bevel gear 157 fixed to a large spur gear 158 which in turn meshes with the spur gear 153 on the worm shaft 138. Anchored in casting 159 which bolts into the side rail 1 of the chassis frame and carries the ball bearing 139, is a bolt 160 secured to 159 by nut 161, the outer end of said bolt 160 having an enlargement 162 in which is mounted a bearing for the steering shaft 154. Bolt 160 also carries a ball bearing 163 on which gears 157 and 158 revolve. With the steering shaft supported in the manner shown it is possible to adjust the height of the steering column without adjusting any of the gears. In the drawings no covers are shown for any of these gears; but of course in practice they would all be enclosed in the conventional manner.

The rate of flexibility of the spring suspension for motor vehicles is sharply limited in all conventional designs, because if it is soft, it will strike through often, and will roll badly on turns.

In the present application a design is presented to overcome this limitation, by the use of a dual suspension, comprising a coil spring mounted in series with a laminated leaf spring. The coil having a very low rate gives an extremely soft ride, but its stroke is restricted by the amount of opening between its coils and when this is taken up, the leaf spring takes all the remaining portion of the stroke, and as it is much stiffer it prevents frequent bottoming. Thus we secure a spring suspension suitable for either good or bad roads. Rolling is controlled by other factors described later herein. In addition to increased flexibility of the spring suspension overall, in the present case means have been devised to greatly increase the flexibility under one wheel rise, while at the same time increase the resistance to rolling. Referring to Fig. 3, if the vehicle is in motion and wheel 3 rises two inches sections C and F of the semi-elliptic spring will each be flexed one inch, because spring C, F is pivotally connected at its center through telescoping tubes, to the frame of the car by ball joint 91 and is free to move endwise on shackles 19 and 20. Under these conditions the forces stored in each end of the spring are bound to equalize, giving equal flexure to each end of the spring. From the above it is evident that the semi-elliptic spring gives double flexibility under one wheel shocks. In the case of the coil spring 24 mounted at the center of the semi-elliptic spring 23, if the wheel 3 rises two inches, the coil spring 24 being mounted in the middle of the lever 23, it will only rise half the amount or will be flexed one inch for a two inch wheel rise, which means that it also gives double flexibility under one wheel rise. The leaf spring and coil being in series with each other it follows from the above that the spring assembly 23 and 24 when considered as an assembly, gives double flexibility under one wheel rise. This applies to both the front and rear suspension.

Referring to Figs. 1 and 2, as the ball and socket joints at each end of the car carry a vast percentage of the load, it becomes evident that the natural rolling axis of the chassis frame and body would be the line M—N. As the stabilizer springs 58, 59, 60 and 61 are of a low rate (about 50 lbs. to the inch of wheel rise) and the vehicle being supported along its center line M—N on ball and socket joints, it is clearly evident that the frame and body will be relieved from heavy twisting stresses when passing over uneven road surfaces. From the above facts it must also be evident that the load on the wheels on one side of the vehicle is always approximately equal to the load on the wheels on the opposite side. This equalization will insure better traction and prevent tramping, so called. Referring to Fig. 2 it will be noted that the axis line of support of the chassis frame and body M—N is high. This insures additional stability when rounding curves as is demonstrated in the diagram Fig. 11. Here the center line of gravity of the vehicle is approximate to the height of line M—N, consequently the mass above and below it are equal, and the centrifugal force acting on the mass above is cancelled by the same force acting on the mass below it.

As shown in Figs. 1, 2 and 3, the differential is firmly attached to the cross member 9 of the frame, and if the frame rolls, ball joints 6 and 7 will have to roll with it. In Fig. 3, with center V, and distance V, R, a described circle will pass through the centers P, Q, of the ball joints 6 and 7. With center V, and distance V, S, a described circle will pass through the center of ball joint 91. If rolling takes place around center V, it is evident that the ball 91 would have to move in a lateral direction. This movement would be resisted by the telescoping tubes between ball joint 91 and leaf spring C—F. If the movement continued it would necessitate the bodily lifting of the weight of the frame on one of the swinging shackles 19, or 20 according to the direction of the movement. The setting of these shackles 19 and 20 at a considerable angle to the vertical plane gives inherent stability against the above mentioned movement. In any rolling movement around center V, the side members 1—1 of the frame would have to roll also, and this movement would be resisted by the four stabilizer coil springs 58, 59, 60 and 61, two of these springs being compressed, and two on the opposite side of the frame being under tension, with center 91 and distance 91—T and 91—M strike the arcs T, W, and X, Z. If the side members 1—1 of the frame roll around center 91, it is evident that the movement will be resisted by the direct reaction of all four stabilizer springs. The two coils on the side which is depressed, will be compressed and the two coils on the other side which is raised will be stretched. These two points 91 and V are the only possible rolling axis of the vehicle, and as the ball 91 and its corresponding one at the opposite end of the vehicle carry nearly all the load, it is the natural rolling axis of the vehicle. The stabilizer coil springs are placed in the most advantageous location to furnish immediate and direct resistance against roll, and being open coils designed to offer equal resistance against either compression or tension all four will combine to resist rolling of the vehicle frame. As the car cannot roll there will be no tendency to lift the wheels on the inside when rounding curves, consequently the car will be much safer to drive. In all conventional types of spring suspensions the resistance to rolling is furnished by the direct resistance of the springs to flexure. As the springs at the front end of a car are of necessity much stiffer than those at the rear, the car frame and body have a decided tendency to follow the tilts in the road with the front axle. In the novel suspension herein described the resistance to rolling is equal at the front and rear end of the car, and consequently a great deal of disagreeable movement of the body will be eliminated.

In the present invention every point of contact between the running gear and frame is insulated by rubber or similar material and this will eliminate destructive high frequency vibrations and greatly reduce shock. Where the front axles and front and rear torque arms are attached to the frame, large sized cushioned bushings are employed. Where the spring suspension at both the front and rear end of the car connects to the frame, large area rubber pads or the like are interposed, and there is no metal to metal contact. The differential case, where it attaches to the frame, is also insulated with similar pads. By employing a comparatively large area of rubber or similar material at all these points, the weight per square inch of bearing surface is low, and the rubber or the like has enough resiliency left to really fulfill its purpose. The design is such that in spite of the rubber softness no side movement is permitted at any of these joints. The shackles connecting the stabilizer springs with the running gear are also rubber bushed.

In Figs. 1 and 2 it is clearly shown that the main spring assembly at both the front and rear of the car are placed at a considerable angle (preferably 30 degrees) to the vertical plane. Referring to the rear spring assembly for example, the same is hung at the top on ball and socket joints 91 and at the bottom on ball and socket jointed shackles 19 and 20, thus the assembly is free to rock in a fore and aft direction. As the wheels 3 and 4 rise they follow a path in the vertical plane as do also the shackles 19 and 20 and consequently the angle of a line drawn through the center of 19 and 91 with the vertical plane, would increase as 19 and 20 continue to rise. In the present case the increase in angle when the wheels are at the top of their stroke, amounts to about 15 degrees. Figs. 12 and 13 are simple diagrams to illustrate what this changing of angle means. Fig. 12 shows a base to which is pivotally connected at one end, a beam carrying a weight, the other end of the beam is supported by a coil spring interposed between it and the base. The spring is placed at a considerable angle to the transverse vertical plane. If the beam is depressed to the position shown in Fig. 13 with the spring horizontal, it is evident that the spring cannot raise the weight, because the force stored up in the spring no longer has any vertical component. From this by a simple process of reasoning it can be seen that the greater the angle, the less the vertical component of the force stored in the spring, and consequently the slower the return of the weight to its original position.

From elementary mechanics, the resolution of forces, is represented in Fig. 14. Here a force is acting in the direction O—A which can be resolved into two equal forces acting along lines O—B and O—C at right angles to each other. If the angle B—O—A is increased, and the angle A—O—C is decreased, the horizontal component of the force O—C is increased and the vertical component of the force O—B is decreased.

The proportion of changes due to changing angle are shown graphically in Fig. 15. A—B is the unit of time for the reaction of the spring, and 1400 lbs. as the load. If the spring is placed so that the line of force acting through it against the load, is at an angle of 31 degrees to the vertical, 222 pounds are added artificially to the load and the unit of time for the reaction of the spring is increased by B—C. When under stroke, the angle of the line of force acting through the springs is increased to 45 degrees to the vertical, then 566 lbs. artificial load is added, and the time for the return of the spring to normal position is increased by B—D, resulting in a very substantial slowing down of the return movement, which in practice means reduced overbounding, after bounding and pitching.

A coil spring not having any exterior friction is more sensitive and easier started into motion than a leaf spring of the same rate. In the present invention the travel or stroke of the coil spring is restricted within certain limits, on the compression stroke, by the coils closing on each other, and it cannot rebound past normal because it is stopped by the limit set for travel of the piston in the shock absorber. The coil being in series with the semi-elliptic spring, no unpleasant shocks will result from this restriction, but the amplitude of movement of the car body will be reduced. The rates of flexibility of the coil and leaf springs differ very greatly, the coil being much the softer, consequently they have entirely different periods of oscillation, and as a result it would be impossible to have both springs synchronize with the road undulations at the same time. If the springs of a car get into synchronization with the road undulations, the result is unpleasant and dangerous, so that this feature of the invention is important.

The coil, being the softer of the two springs, will take the largest proportion of the flexure during the first part of the wheel rise, while the leaf spring which is much stiffer will take most of the flexure on the last part of the wheel rise. As the angle of the spring changes more rapidly on the last part of the wheel stroke, it will effectively prevent overbounding caused by the leaf spring. The speed of the coil spring is checked some by the increased angle, but mostly by the hydraulic shock absorber built in combination with it. No additional shock absorbers would be required, and the free powerful leaf spring would keep the wheels down against the road surface at all times.

Another distinct advantage of this design is that it permits of a very low hung chassis. Only half the amount of clearance between the axles and the frame is required as compared to conventional designs. If wheel 3 is raised six inches, the point on the axle tube 2, underneath the side rail of the frame being half way between the wheel and the hinge axis A—B, will only rise half the amount or three inches. As the differential rises and falls with the frame instead of in relation to it, it is possible to place the seat cushion directly on top of it.

Further, there is considerably less unsprung weight in this design, as the main body of the springs and the differential are not carried on the axles. The main suspension springs have no other function to perform except to support the load, and are not subjected to torsion, so their action will be smoother. The position of the wheels in relation to the center line of the chassis is controlled positively, and they cannot shift momentarily out of line as is possible where the axle is controlled by springs. The annoying phenomena of shimmy and nose shake will be found missing during the operation of this design of suspension.

Referring to Fig. 6, when the coil spring is compressed by a shock, the piston 117 moves downward in relation to tube 85, the valve 119 is forced up by the pressure of the oil, and some of the oil escapes from in front of the piston by passing through the ports in tube 123 and as the piston progresses downward the number of ports ahead of it become less, so that a progressive resistance is obtained. If the shock is great enough to carry the piston down into contact with plate 124 the valve ports in the piston are covered, and the end of the cylinder becomes in effect a dash pot to cushion the last end of the stroke. On the return stroke of the piston the valve in piston 117 is forced closed by the pressure of the oil, so that the resistance on the up stroke is greater than on the down stroke. Tube 116 to which the piston 117 is attached also has a series of holes at regular intervals along its length, through which oil escapes and flows back behind piston 117 when it is travelling upwardly. As tube 116 advances upwardly through the opening in the bottom of the member 109, the number of ports in tube 116 left below said opening grows less, so again there is a progressive resistance. When the piston begins its travel upwardly the valve 121 is forced shut by the pressure of oil, and on the last part of the upward travel of the piston there being no escapement for the oil, an oil dash pot effect is produced to prevent shock when the piston brings the valves 118 and 121 into contact. When this occurs it is impossible for the coil spring to travel further upwardly so that its rebound is absolutely limited. The recess in the cylindrical member 109 acts as an oil reservoir for the shock absorber chamber proper, and when the piston 117 moves downwardly, valve 121 is sucked open and the reservoir replenishes the space behind the piston with oil, thus preventing the formation of any vacuum. If a series of rapid small movements of the piston should take place when it is at the top of the compression chamber, there is between the two valves 118 and 121 a circular spring attached to one of the valves whose office is to insure that on these quick reversals of direction, said valves are instantly closed. The constant movement of the parts will insure proper lubrication by splash on the inside walls of tube 88 which telescopes with tube 85. Oil collecting ring 110 will wipe off the surplus oil and return it to the reservoir through ducts 111 and 112. Piston ring 113 serves somewhat the same purpose, and the final wiping process is performed by a felt gasket 128 which is held tightly against tube 85 by a contracting piston ring 129. Dust tube 130 insures the exclusion of dust and dirt from the oil coated surface of tube 85. The shock absorber is charged and replenished through tube 131 and its connecting duct in the top or head piece 89, which tube can be led to any convenient location on the frame and an overflow port is provided at 132 to prevent overcharging. After the head piece 89 passes port 132 the air inside tube 88 is compressed, adding some resistance to the action of the shock absorber and increasing the speed of flow of oil past and behind the piston. It is noteworthy that there is no chance for leakage in this shock absorber and there are no glands under heavy pressure.

As stated previously herein, where independently sprung wheels are used, a special type of steering gear and linkage are necessary. To be successful it is essential, that the arc of travel up and down of the ball on the steering arm 135, Fig. 8, be identical to the arc of travel of the drag link socket attached thereto, otherwise the wheels will be pulled or shoved out of the desired line of travel and shimmy may result. In Fig. 8 the pivotal axis of the drag link 152 is in the exact center of the pivotal axis of the axle 31, therefore the arc of travel of both the ball fast to steering arm 135 and its socket in drag link 152 is the same along the arc O—P. The drag link 151 on the opposite side is located in exactly the same manner in relation to its axle 32 so that the action is the same. Moving away from the normal straight ahead position of the wheels to the extreme lock, it will be found that 145 moves in a transverse direction to 145'. The arc of travel of the socket on the outer end of the drag link 152 is now along R—Q, while the travel of the ball on arm 135 is along the line X—Y. It will be seen that within the working range of the wheel travel, up and down, the divergence is practically nothing.

When a car makes a turn, the turning angle of the wheel on the inside of the curve must be greater than the turning angle of the wheel on the outside, because the inside circle along which the wheel is moving is smaller than the circle described by the outside wheel. In Fig. 7 it will be noted that this layout is ideal in this respect, one wheel has turned 50 degrees while the other only 37 which is correct for a car with 117 inch wheel base. The relation of turning between the two wheels can be made correct for any given wheel base by altering the fore and aft location of the balls 144 and 145 and the angle and length of steering arms 135 and 136.

It is apparent of course that by revolving the worm gear, the large nut thereon which is connected to the drag links, will be moved back and forth swinging the wheels. The pitch of the worm gear can be as desired.

The fewer joints there are between the wheels and the worm gear in a steering assembly, the less liability exists of developing slack. In this design there are only two joints between the wheels and the worm gear. It will be clearly seen in the drawings, that the drag links control the road wheels in a very direct manner, and this combined with the positive location of the road wheel in relation to the frame should eliminate any tendency to shimmy. Through the use of ball bearings friction would be reduced to a minimum, and it is possible to make the steering as slow or as fast as desired.

In practice the gears would of course have suitable coverings to exclude dirt and promote lubrication.

Various detail changes and substitution can be made in the assembly and it is equally practical to use a coil spring or a number of them in series with the transverse laminated leaf spring.

What is claimed is:

1. In a vehicle suspension, the combination with a frame and running gear, of front and rear transverse springs, universal joint connections between said springs and the frame located on the longitudinal center axis of said frame and between the springs and running gear, and means for preventing lateral movements and excessive rolling of said frame on the running gear.

2. In a vehicle suspension, the combination with a frame and running gear, of front and rear transverse springs, each comprising superimposed spring members, universal joint connections between said springs and the frame located on the longitudinal center axis of said frame and between the springs and running gear, and means for preventing lateral movements and excessive rolling of said frame on the running gear.

3. In a vehicle suspension, the combination with a frame and running gear, of front and rear transverse springs, each comprising superimposed spring members rigidly connected together, universal joint connections between said springs and the frame located on the longitudinal center axis of said frame and between the springs and running gear, and means for preventing lateral movements and excessive rolling of said frame on the running gear.

4. In a vehicle suspension, the combination with a frame and running gear, of front and rear transverse springs, each comprising a laminated leaf spring and a superimposed coil spring member rigidly connected together, universal joint connections between said springs and the frame located on the longitudinal center axis of said frame and between the springs and running gear, and means for preventing lateral movements and excessive rolling of said frame on the running gear.

5. In a vehicle suspension, the combination with a frame and running gear, of front and rear transverse springs, each comprising superimposed spring members rigidly connected together, universal joint connections between said springs and the frame located on the longitudinal center axis of said frame and between the springs and running gear and supplemental springs for preventing lateral movements and excessive rolling of said frame on the running gear.

6. In a vehicle suspension, the combination with a frame and running gear, of front and rear transverse springs mounted at an angle to the vertical, universal joint connections between said springs and the frame located on the longitudinal center axis of said frame and between the springs and running gear, and means for preventing lateral movements and excessive rolling of said frame on the running gear.

7. In a vehicle suspension, the combination with a frame and running gear, of front and rear transverse springs, each comprising superimposed spring members mounted at an angle to the vertical, universal joint connections between said springs and the frame located on the longitudinal center axis of said frame and between the springs and running gear, and means for preventing lateral movements and excessive rolling of said frame on the running gear.

8. In a vehicle suspension, the combination with a frame and running gear, of front and rear transverse springs, universal joint connections between said springs and the frame located on the longitudinal center axis of said frame and between the springs and running gear, and longitudinally disposed members yieldably connected to the running gear and fixed to the frame.

9. In a vehicle suspension, the combination with a frame and running gear, of front and rear divided axles, front and rear transverse springs, universal joint connections between said springs and the frame located on the longitudinal center axis of said frame and between said springs and running gear, and means for preventing lateral movements and excessive rolling of said frame on the running gear.

10. In a vehicle suspension, the combination with a frame, of a running gear including front and rear divided axles, pivotal connections between said axles and frame, front and rear transverse springs, universal joint connections between said axles and springs, universal joint connections between said springs and frame located on the longitudinal center axis of said frame, and means for preventing lateral movements and excessive rolling of said frame on the running gear.

11. In a vehicle suspension, the combination with a frame, of a running gear including front and rear divided axles, pivotal connections between the inner ends of said axles and frame, front and rear transverse springs, universal joint connections between the outer ends of said axles and springs, universal joint connections between the intermediate portions of said springs and frame located on the longitudinal center axis of said frame and means for preventing lateral movements and excessive rolling of said frame on the running gear.

12. In a vehicle suspension, the combination with a frame, of a running gear including front and rear divided axles, pivotal connections between the inner ends of said front axles and frame, a universal joint connection between the inner ends of said rear axles and frame, front and rear transverse springs, universal joint connections between the outer ends of said springs and their respective front and rear axles, a universal joint connection between the intermediate portion of each spring and the frame, and longitudinally disposed leaf springs for preventing lateral movements and excessive rolling of said frame on the running gear.

13. In a vehicle suspension, the combination with a frame and running gear, of front and rear divided axles, front and rear transverse springs, universal joint connections between said springs and the frame located on the longitudinal center axis of said frame and between the frame and running gear, a steering gear associated with said divided front axle and means for preventing lateral movements and excessive rolling of said frame on the running gear.

14. In a vehicle suspension, the combination with a frame, of a running gear including front and rear divided axles, pivotal connections between said axles and frame, front and rear transverse springs, universal connections between said axles and springs, universal connections between said springs and frame located on the longitudinal center axis of said frame, a transversely arranged steering gear associated with said pivoted front axles and means for preventing lateral movements and excessive rolling of said frame on the running gear.

15. In a vehicle suspension, the combination with a frame and running gear, of front and rear transverse spring members, each comprising a leaf spring having a coil spring rigidly mounted thereon at its intermediate portion, a universal joint connection between the upper end of said coil spring and the frame located on the longitudinal center axis of said frame, a universal joint connection between the ends of each leaf spring and the running gear and means for preventing relative lateral movement and excessive rolling of said frame on the running gear.

16. In a vehicle suspension, the combination with a frame, of a running gear including front and rear divided axles, pivotal connections between the inner ends of said axles and frame, front and rear transverse spring members, each comprising a leaf spring having a coil spring member rigidly mounted thereon at its intermediate portion, a universal joint connection between the upper end of said coil spring member and frame, a universal joint connection between the ends of each leaf spring and the outer ends of their respective axles and supplemental leaf springs for preventing lateral movements and excessive rolling of said frame on the running gear.

17. In a vehicle suspension, the combination with a frame and running gear, of front and rear divided axles, front and rear transverse springs, universal joint connections between said springs and the frame located on the longitudinal center axis of said frame and between said springs and running gear, torque arms rigidly secured to said axles and pivotally secured to the frame, a steering gear associated with said divided front axle and means for preventing relative lateral movement and excessive rolling of said frame on the running gear.

18. In a vehicle suspension, the combination with a frame and running gear, of front and rear transverse springs, universal joint connections between said springs and the frame located on the longitudinal center axis of said frame and between said springs and running gear, and means for insulating or cushioning all joints between the frame and running gear.

19. In a vehicle suspension, the combination with a frame, of a running gear including front and rear composite axles, pivotal connections between said axles and frame, front and rear transverse springs connected at their ends to the running gear by universal joints, and at their intermediate portions to the frame by telescoping members one of said members being rigidly attached to the transverse spring and the other member connected by a universal joint to the frame, a coil spring concentric with the telescoping members and in series with the leaf spring, and means to prevent excessive rolling of the frame on the running gear.

STEPHEN LEONARD CHAUNCEY COLEMAN.